United States Patent
Mackal et al.

[15] 3,696,494
[45] Oct. 10, 1972

[54] VALVE EXTRACTOR

[72] Inventors: Henry H. Mackal, Fort Lauderdale, Fla.; Kenneth P. Behnke, New Milford, N.J.

[73] Assignee: Halkey-Roberts Corp., Parmans, N.J.

[22] Filed: March 8, 1971

[21] Appl. No.: 121,729

[52] U.S. Cl. ................................... 29/213, 29/235
[51] Int. Cl. ............................................ B23p 19/04
[58] Field of Search........29/213, 235, 236, 237, 282, 29/280

[56] References Cited

UNITED STATES PATENTS

| 389,441 | 9/1888 | Callahan | 29/237 |
| 2,734,260 | 2/1956 | Wyckoff | 29/282 X |
| 3,634,921 | 1/1972 | Gagnon | 29/237 |

*Primary Examiner*—Robert C. Riordon
*Assistant Examiner*—J. C. Peters
*Attorney*—Alfred W. Vibber

[57] ABSTRACT

A device for extracting fittings such as valves from elastomeric tubes into which they are telescoped and in which they are securely held by the resilient contraction of the tube thereabout. The valve extracting device comprises a thin-walled circular cylindrical tube which is inserted in an axial direction between the outer end of the valve and the tube and is progressively thrust therebetween. During this operation the tube is progressively freed from the valve, so that the valve may finally drop downwardly through the axial passage in the tool and thus be recovered. The elastomeric tube is then pushed off the thin-walled tubular portion of the extractor by a collar or sleeve which is slidably mounted upon the thin wall of the extractor so as to engage the outer free end of the elastomeric tube and to thrust it axially along the thin wall of the extractor.

9 Claims, 6 Drawing Figures

3,696,494
PATENTED OCT 10 1972
SHEET 1 OF 2
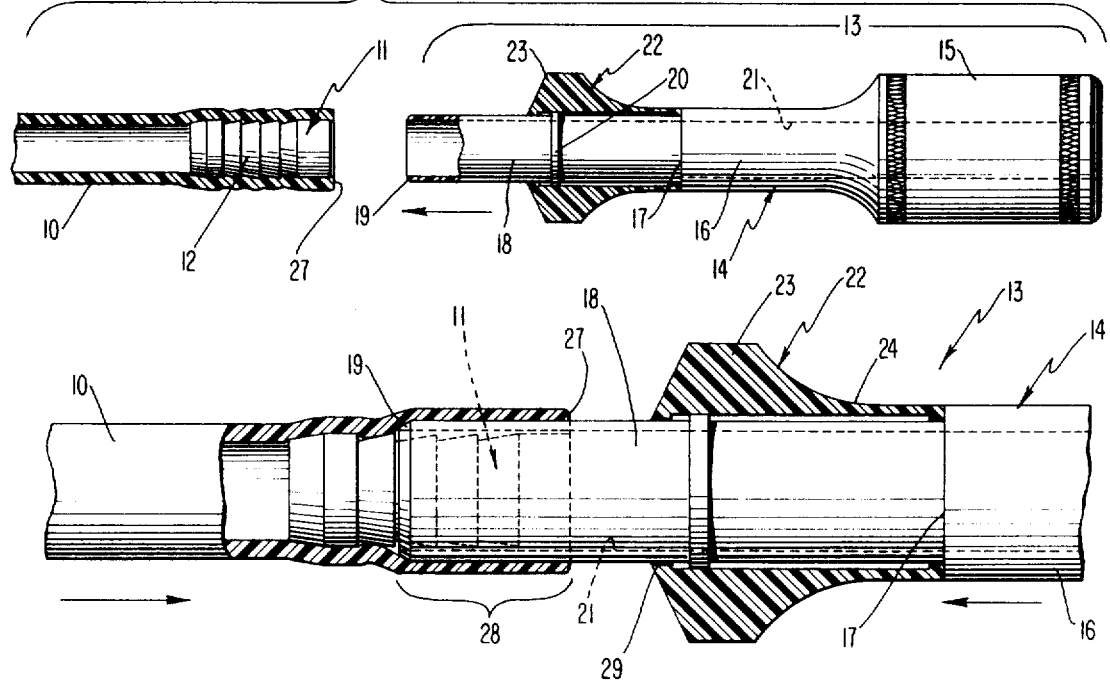
Fig. 1
Fig. 2
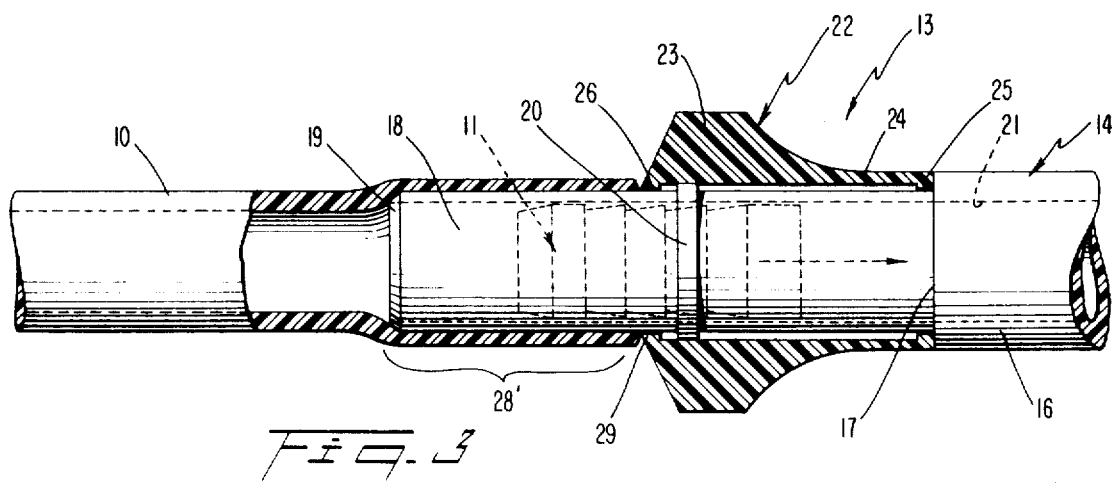
Fig. 3
INVENTORS
HENRY H. MACKAL
KENNETH P. BEHNKE
BY
Alfred W. Vibber
ATTORNEY

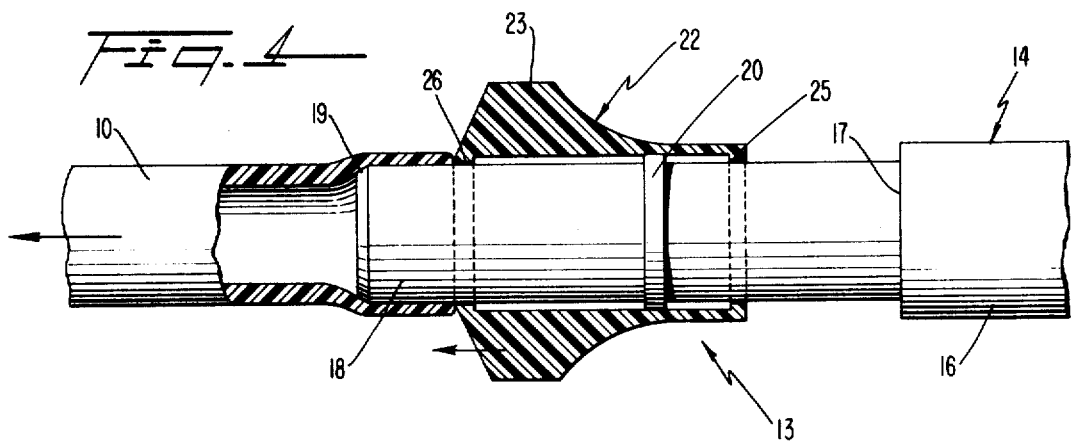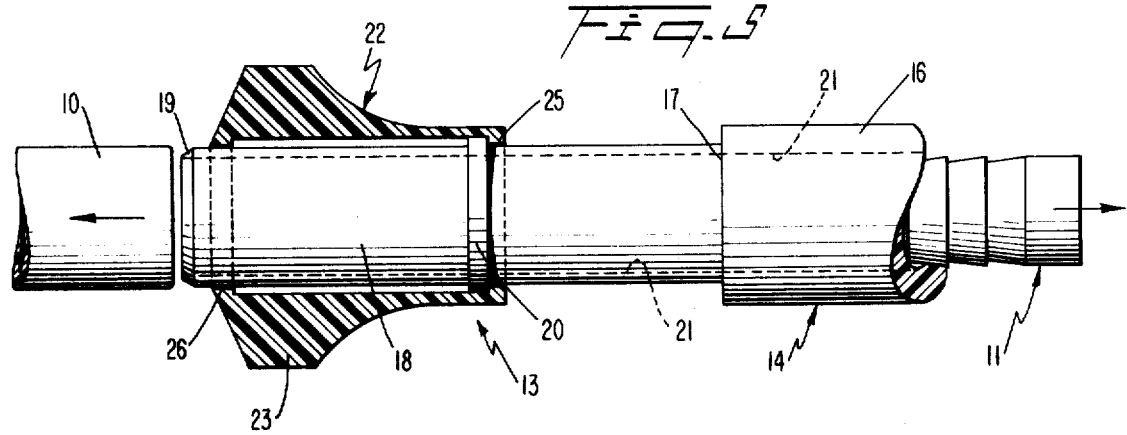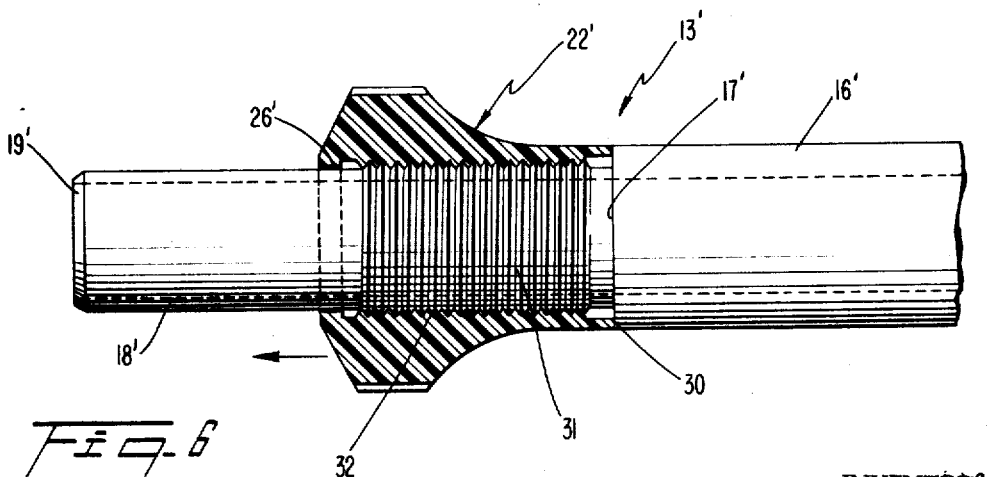

VALVE EXTRACTOR

This invention relates to a device for extracting fittings such as valves from elastomeric tubes in which the valves are forcibly frictionally held by contraction of the elastomeric tube thereabout. The valve extractor of the invention is so constructed and functions in such manner as to quickly and easily remove the valve from the elastomeric tube without damage to either.

Although the valve extractor of the invention is capable of use in many fields, it will be disclosed in connection with its use in connection with life vests, life rafts, and other inflatable articles. Taking life vests, for example, many of such vests are now made of woven nylon impregnated with polyurethane. Such vests have two chambers, one in front of the other, covering the entire chest of a person. One mouth inflation tube with a check valve is on the right side for one chamber, and another mouth inflation tube with valve is on the left side for the second chamber. The tubes are sealed to the respective sides of the vest.

If, after inflation tests, one or more of the valves of a given vest proves to be faulty, they must be replaced. However, valves are very difficult to remove manually. The tubes cannot be cut off rearwardly of the valves, because the inflation tube would then be too short to meet specifications. The extractor tool of this invention provides simple and easy removal of such valves from the inflation tubes. By its use, the extractor tool now only prevents damage to the inflation tubes or valves, but it obviates what was formerly very hard, disagreeable work.

In the drawings which accompany the specification and form a part thereof:

FIG. 1 is a view partially in side elevation and partially in vertical axial section of the outer end of an inflation tube containing an inflation valve and a first embodiment of valve extractor of the invention, the extractor being shown aligned with the inflation tube and about to be applied thereto;

FIG. 2 is a view similar to FIG. 1 but with the extractor applied to the outer end of the inflation tube and with the thin-walled sleeve of the extractor inserted at a mid-position into the tube;

FIG. 3 is a view similar to FIG. 2 but with the thin-walled sleeve of the extractor having been fully inserted into the outer end of the inflation tube;

FIG. 4 is a view similar to FIGS. 2 and 3, but with a tube-removing collar mounted on the thin-walled sleeve of the extractor thrust partially to the left in order to remove the elastomeric tube from the thin-walled sleeve of the extractor;

FIG. 5 is a view similar to FIG. 4 but with the tube-removing collar having been thrust fully to the left and the elastomeric tube having been fully removed from the thin-walled sleeve of the extractor; and FIG. 6 is a view partially in side elevation and partially in vertical axial section of a second embodiment of the valve extractor in accordance with the invention.

As will be apparent from the above, two embodiments of the valve extractor in accordance with the invention are shown herein. The first such embodiment is shown in FIGS. 1–5, inclusive; in such extractor the slidable collar which thrusts the elastomeric tube from the thin-walled sleeve of the extractor is freely slidable upon the extractor body. In the second embodiment, shown in FIG. 6, the thrusting collar is threadedly mounted upon the main body of the extractor.

Turning now to the embodiment of FIGS. 1–5, inclusive, there is shown in such figures an inflation tube 10 made of elastomeric material such as urethane. Telescopically mounted within the tube 10 at the outer end thereof is a check valve which is shown generally at 11. Such check valve has a housing, the outer surface of which is provided with a plurality of annular ribs 12 of sawtooth section as shown, such ribs being of frusto-conical shape and being bounded at their larger diametered ends by sharp, annular shoulders so as forcibly to retain the valve 11 in the tube 10. In the embodiment shown, the outer end of the valve 11 is set back a short distance inwardly of the outer end surface 27 of the tube 10.

The extractor tool of FIGS. 1–5, inclusive, is designated generally by the reference character 13. Such tool has a main body 14 having at its right-hand end an enlarged circular cylindrical portion 15 serving as a handle. The left-hand end of handle portion 15 is joined by an annular, concave zone to an elongated, circular cylindrical portion 16 which is coaxial of the handle 15. The left-hand end of portion 16 is bounded by a sharp, transverse, annular shoulder 17; to the left of shoulder 17 the main body of extractor extends as a thin-walled elongated sleeve portion 18 coaxial of the portions 15 and 16. An axially extending circular cylindrical passage 21 extends completely throughout the lengths of portions 15, 16, and 18 of the main body of the extractor tool. The passage 21 has a diameter which somewhat exceeds that of the outer diameter of valve 11 so that such valve, when freed from the tube 10, may slide freely axially through passage 21.

The thin-walled sleeve 18 of the extractor tool has a forward, free edge 19 which is beveled, that is, is of frusto-conical shape converging in a direction from right to left as the tool is shown in FIGS. 1–5, inclusive. Approximately midway of its length the thin-walled tubular sleeve portion 18 of the tool is provided with a transversely extending annular rib 20. Slidably mounted upon the thin-walled portion 18 of the extractor is a collar 22 which engages the outer free end 27 of the elastomeric tube 10, in the final step of valve extraction, to thrust the tube 10 to the left of the thin-walled sleeve 18 of the extractor tube. The collar 22 has an enlarged annular portion 23 which serves as a finger and thumb engaged handle portion. Portion 23 is joined to a thin-walled sleeve portion 24 by a concave annular zone against which the fingers and thumb of the operator may press when he is thrusting tube 10 off the extractor tool.

The collar 22 is accurately guided upon the thin-walled tubular portion 18 of the extractor tool by a radially inwardly extending shallow annular flange 25 at the right-hand end thereof and a similar flange 26 at the left-hand end thereof. In the retracted, right-hand terminal position of collar 22, as shown in FIGS. 2 and 3, the outer surface of flange 25 engages the shoulder 17 on the main body of the extractor tool. In the fully advanced position of the collar 22, as shown in FIG. 5, the inner surface of the flange 25 engages the right-hand shoulder surface of the annular rib 21 on the extractor tool to prevent the escape of the collar 22 from the main body of the tool.

FIGS. 1-5, inclusive, show successive steps in a valve-extracting operation with the first embodiment of the extractor. With the collar 22 fully retracted to its right-hand position to abut shoulder 17, the extractor 13 is positioned coaxial of the tube 10 and the two are advanced relative to each other so that the free end 19 of the thin-walled sleeve 18 is inserted between the outer end of the tube 10 and the outer end of the valve 11. The tube 10 and the tool 13 are then progressively advanced toward each other, there being formed an enlarged portion in the outer free end of the tube 10 which in FIG. 2 is designated 28 and in FIG. 3, having grown somewhat longer, is designated 28'. When the sleeve 18 has reached the position in FIG. 3, it will have progressed inwardly of the tube 10 well beyond the inner end of the valve 11 and thus have freed the valve from the tube 10. In such fully inserted position of the extractor tool, shown in FIG. 3, the outer end 27 of the tube 10 is engaged by the radially inner annular surface 29 at the left-hand end of the collar 22.

The operator then begins to thrust the collar 22 to the left. This pushes the elastomeric tube 10 progressively off the sleeve 18 of the extractor tool as shown in FIG. 4. By the time that the collar 22 has reached its left-hand terminal position, at which time the flange 25 of the collar engages the annular rib 20 on the sleeve 18, the collar will substantially have pushed the tube 10 completely off the sleeve 18, so that the tube 10 may be readily removed from the extractor and vice-versa. When the sleeve 18 is in any one of the positions relative to the tube 10 shown in FIGS. 3, 4, and 5, the valve 11, which has then been freed from this tube 10, will fall freely downwardly through the passage 21 in the extractor tool if the extractor tool is held vertically with handle 15 positioned lowermost. The valve 11 is shown emerging from the portion 16 of the extractor in FIG. 5.

In the second embodiment of extractor, shown fragmentarily in FIG. 6, parts which are the same as those in the first embodiment of FIGS. 1-5, inclusive, are designated by the same reference characters but with an added prime. The tool 15' of FIG. 6 differs from the previously described extractor tool 13 primarily in that the right-hand end of the thin-walled sleeve 18' is externally threaded at 31 and the collar 22' is internally threaded at 32 so as threadedly to engage the portion 31 of the sleeve 18'. In the retracted position of the collar 22' shown in FIG. 6, the rear end of the axially extending flange 30 on collar 22' engages the shoulder 17' on the portion 16' of the extractor tool.

In the use of the tool 13', after the thin-walled sleeve 18' has been inserted into its fully inserted position such as that shown in FIG. 3 of the first embodiment, into the elastomeric tube 10, the collar 22' is turned in the proper direction so as to advance the collar to the left, thereby to thrust the elastomeric tube 10 off the thin-walled sleeve 18'. In its terminal left-hand position, the collar 22' will occupy a position relative to the portion 16', 18' of the extractor tool which is substantially the same as that shown in FIG. 5 of the first embodiment of the extractor tool.

The various parts of the extractor tool may be made of a number of materials of suitable properties including strength, specific gravity, and coefficient of friction. A number of metals as well as plastic materials are suitable for the tool; the latter, an acetal resin known as "Debrin" has proved to be eminently satisfactory for this purpose.

Although the invention is illustrated and described with reference to a plurality of preferred embodiments thereof, it is to be expressly understood that it is in no way limited to the disclosure of such a plurality of embodiments, but is capable of numerous modifications within the scope of the appended claims.

What is claimed is:

1. A device for extracting a fitting from an elastomeric tube within which it is tightly and sealingly disposed, comprising a main body including an elongated thin-walled cylindrical sleeve having an axial passage therein with a diameter at least slightly exceeding the diameter of the fitting, a handle affixed to the main body so that the sleeve may be thrust axially rearwardly of the tube and fitting to be telescoped between the tube and fitting, the sleeve having an axial length exceeding that of the fitting, and means on the sleeve for thrusting the tube axially toward the free end of the sleeve and off the sleeve after the sleeve has been inserted therein to a depth beyond the inner end of the fitting, whereby to remove the fitting from the tube.

2. A device according to claim 1, wherein the means for thrusting the tube off the sleeve comprises a collar mounted on the main body of the device for axial movement with respect thereto.

3. A device according to claim 2, wherein the outer surface of the main body of the device, and the inner surface of collar which is slidable thereon are of circular cylindrical shape so that the collar may travel axially of the main body without turning with respect thereto.

4. A device according to claim 2, comprising threads on the outer surface of the main body of the device, and threads mating therewith on the inner surface of the collar, whereby turning the collar with respect to the main body causes the collar to travel axially with respect to the main body.

5. A device according to claim 2, comprising abutment means for stopping the travel of the collar in forward and rear terminal positions with respect to the main body.

6. A device according to claim 1, wherein the axial passage in the sleeve extends completely through the device, so that the fitting may be removed by permitting it to fall through the device after removal from the tube.

7. A device according to claim 1, wherein the handle is an enlarged circular cylindrical part coaxial of and connected to the rear end of the sleeve.

8. A device according to claim 5, wherein the collar has a passage therethrough which receives the sleeve, the passage through the collar having a diameter which substantially exceeds the outer diameter of the sleeve, and comprising radially inwardly directed flanges on the forward and rear ends of the collar accurately guiding the collar for axial movement along the sleeve.

9. A device according to claim 8, wherein the abutment means for the collar comprise a shoulder on the sleeve which is engaged by the rear surface of the rear flange on the collar in the rear terminal position of the collar, and a radially outwardly directed protuberance of the sleeve which is engaged by the forward surface of the rear flange on the collar in the forward terminal position of the collar.

* * * * *